United States Patent
Hsu et al.

(10) Patent No.: US 11,520,218 B2
(45) Date of Patent: Dec. 6, 2022

(54) PROJECTION APPARATUS AND PHOSPHOR WHEEL THEREOF

(71) Applicant: Coretronic Corporation, Hsin-Chu (TW)

(72) Inventors: Pi-Tsung Hsu, Hsin-Chu (TW); Chi-Tang Hsieh, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 593 days.

(21) Appl. No.: 16/542,315

(22) Filed: Aug. 16, 2019

(65) Prior Publication Data

US 2020/0064619 A1   Feb. 27, 2020

(30) Foreign Application Priority Data

Aug. 21, 2018   (CN) .......................... 201821346900.1

(51) Int. Cl.
| | |
|---|---|
| G03B 21/16 | (2006.01) |
| G03B 21/20 | (2006.01) |
| G02B 26/00 | (2006.01) |
| G02B 7/00 | (2021.01) |

(52) U.S. Cl.
CPC ........... G03B 21/16 (2013.01); G03B 21/204 (2013.01); G02B 7/008 (2013.01); G02B 26/008 (2013.01)

(58) Field of Classification Search
CPC .... G03B 21/16; G03B 21/204; G02B 26/008; G02B 7/008
See application file for complete search history.

(56) References Cited

U.S. PATENT DOCUMENTS

| | | | |
|---|---|---|---|
| 2016/0077325 A1* | 3/2016 | Tsai ..................... | H04N 9/3114 353/31 |
| 2017/0175989 A1* | 6/2017 | Yamagishi ............ | F21V 29/745 |
| 2017/0293211 A1* | 10/2017 | Kobayashi ............. | G03B 21/14 |
| 2018/0059403 A1* | 3/2018 | Takamatsu ........... | G02B 26/008 |
| 2020/0004118 A1* | 1/2020 | Hsu ..................... | G02B 26/008 |

FOREIGN PATENT DOCUMENTS

| | | |
|---|---|---|
| CN | 204178109 U | 2/2015 |
| CN | 106796387 A | 5/2017 |

* cited by examiner

*Primary Examiner* — Magda Cruz

(57) ABSTRACT

A phosphor wheel and a projection apparatus with the phosphor wheel are disclosed. A phosphor wheel includes a driving motor, a temperature interference element, a substrate and at least one light wavelength converting layer. The driving motor includes a motor body and a rotating member. The motor body drives the rotating member to rotate relative to the motor body along a rotation axis. The temperature interference element is connected with the rotating member and the substrate. The motor body drives the rotating member to rotate the temperature interference element and the substrate relative to the motor body. The substrate includes a first surface and a second surface disposed opposite to each other. The second surface is located between the first surface and the rotating member. The light wavelength converting layer is disposed on the first surface of the substrate.

23 Claims, 10 Drawing Sheets

PROJECTION APPARATUS AND PHOSPHOR WHEEL THEREOF

CROSS-REFERENCE TO RELATED APPLICATION

THIS APPLICATION CLAIMS THE PRIORITY BENEFIT OF CHINA APPLICATION CN201821346900.1 FILED ON 2018 Aug. 21. THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to a projection apparatus and a phosphor wheel thereof, and more particularly to a projection apparatus and a phosphor wheel thereof including a temperature interference element.

BACKGROUND OF THE INVENTION

A projection apparatus is a device that projects an image onto a projection screen for presentation to a user. In order to achieve sufficient output brightness, the illumination system of the projection apparatus usually uses a laser light source and concentrates the generated laser on the phosphor layer of the phosphor wheel to generate sufficient fluorescence intensity output.

However, since heat is generated when the phosphor is irradiated by the laser to excite the fluorescence and the heat is easily conducted to the driving motor of the phosphor wheel, the driving motor may be damaged or have a reduced life by heat. Therefore, how to overcome the damage generated by the phosphor layer to the driving motor of the phosphor wheel is a focus of attention of those in the field.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a phosphor wheel, which can reduce the damage of the heat generated by the light wavelength converting layer to the driving motor.

The invention further provides a projection apparatus, which can reduce the damage of the heat generated by the light wavelength converting layer to the driving motor.

Other objectives and advantages of the invention can be further illustrated by the technical features broadly embodied and described as follows.

In order to achieve one or a part or all of the above or other objectives, an embodiment of the invention provides a phosphor wheel, which includes a driving motor, a temperature interference element, a substrate and at least one light wavelength converting layer. The driving motor includes a motor body and a rotating member. The motor body drives the rotating member to rotate relative to the motor body along a rotation axis. The temperature interference element is disposed on the rotating member. The substrate is disposed on the temperature interference element. The temperature interference element is connected with the rotating member and the substrate. The motor body drives the rotating member to rotate the temperature interference element and the substrate relative to the motor body. The substrate includes a first surface and a second surface disposed opposite to each other. The second surface is located between the first surface and the rotating member. The light wavelength converting layer is disposed on the first surface of the substrate. The light wavelength converting layer is for converting an exciting beam incident on the light wavelength converting layer into a converted beam. The temperature interference element includes at least one spoiler.

In order to achieve one or a part or all of the above or other objectives, an embodiment of the invention provides a projection apparatus, which includes an illumination system, a light valve and a projection lens. The illumination system is for providing an illumination beam. The light valve is disposed on a transmission path of the illumination beam to convert the illumination beam into an image beam. The projection lens is disposed on a transmission path of the image beam. The illumination system includes an exciting light source and the aforementioned phosphor wheel. The exciting light source is for providing an exciting beam. The phosphor wheel is disposed on a transmission path of the exciting beam. The at least one light wavelength converting layer of the phosphor wheel is for converting the exciting beam into the converted beam. The illumination system includes the converted beam and the exciting beam.

In order to achieve one or a part or all of the above or other objectives, an embodiment of the invention provides a phosphor wheel, which includes a driving motor, a temperature interference element, a substrate and at least one light wavelength converting layer. The driving motor includes a motor body and a rotating member. The motor body drives the rotating member to rotate relative to the motor body along a rotation axis. The temperature interference element is disposed on the rotating member. The substrate is disposed on the temperature interference element. The temperature interference element is connected with the rotating member and the substrate. The motor body drives the rotating member to rotate the temperature interference element and the substrate relative to the motor body. The substrate includes a first surface and a second surface disposed opposite to each other. The second surface is located between the first surface and the rotating member. The at least one light wavelength converting layer is disposed on the first surface of the substrate. The light wavelength converting layer is for converting an exciting beam incident on the light wavelength converting layer into a converted beam. The substrate is disposed to surround the temperature interference element.

In order to achieve one or a part or all of the above or other objectives, an embodiment of the invention provides a projection apparatus, which includes an illumination system, a light valve and a projection lens. The illumination system is for providing an illumination beam. The light valve is disposed on a transmission path of the illumination beam to convert the illumination beam into an image beam. The projection lens is disposed on a transmission path of the image beam. The illumination system includes an exciting light source and the aforementioned phosphor wheel. The exciting light source is for providing an exciting beam. The phosphor wheel is disposed on a transmission path of the exciting beam. The at least one light wavelength converting layer of the phosphor wheel is for converting the exciting beam into the converted beam. The substrate is disposed to surround the temperature interference element.

The projection apparatus and the phosphor wheel thereof of the embodiment of the invention can reduce the impact of the heat generated by the light wavelength converting layer on the driving motor by providing a temperature interference element between the driving motor and the substrate, thereby preventing the driving motor from being damaged or having a reduced life by heat.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
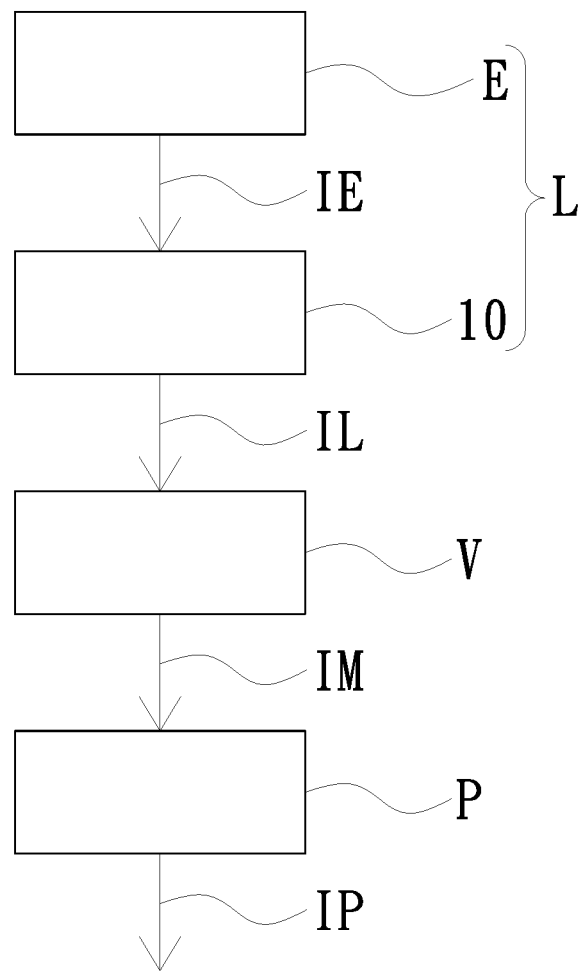
FIG. 1 is a schematic view of a projection apparatus according to an embodiment of the invention.

Refer to FIG. 1. FIG. 1 is a schematic view of a projection apparatus according to an embodiment of the invention. The projection apparatus 1 includes an illumination system L, a light valve V and a projection lens P. The illumination system L is for providing an illumination beam IL. The light valve V is disposed on a transmission path of the illumination beam IL to convert the illumination beam IL into an image beam IM. The projection lens P is disposed on a transmission path of the image beam IM. The illumination system L includes an exciting light source E and a phosphor wheel 10. The exciting light source E is for providing an exciting beam IE. The phosphor wheel 10 is disposed on a transmission path of the exciting beam IE. A light wavelength converting layer (not shown in FIG. 1) of the phosphor wheel 10 is for converting the exciting beam IE into a converted beam (not shown in FIG. 1), and the illumination beam IL may include the converted beam and the exciting beam IE. In addition, the image beam IM may become a projection beam IP after being projected by the projection lens P, and thereby forming an image frame on a projection surface.

The exciting light source E is, for example, a laser diode. In other embodiments, the exciting light source E is, for example, a light emitting diode (LED). In addition, the number of light sources is not limited in the invention. A single light source may be used if the light intensity thereof is strong enough, or, an array of exciting light sources E formed by a plurality of light sources may be used, and the invention is not limited thereto. The light valve V may be realized, for example, by a liquid crystal panel, a digital micro-mirror device (DMD), or a liquid crystal on silicon (LCoS) panel, and the invention is not limited thereto.

Figure 2A:
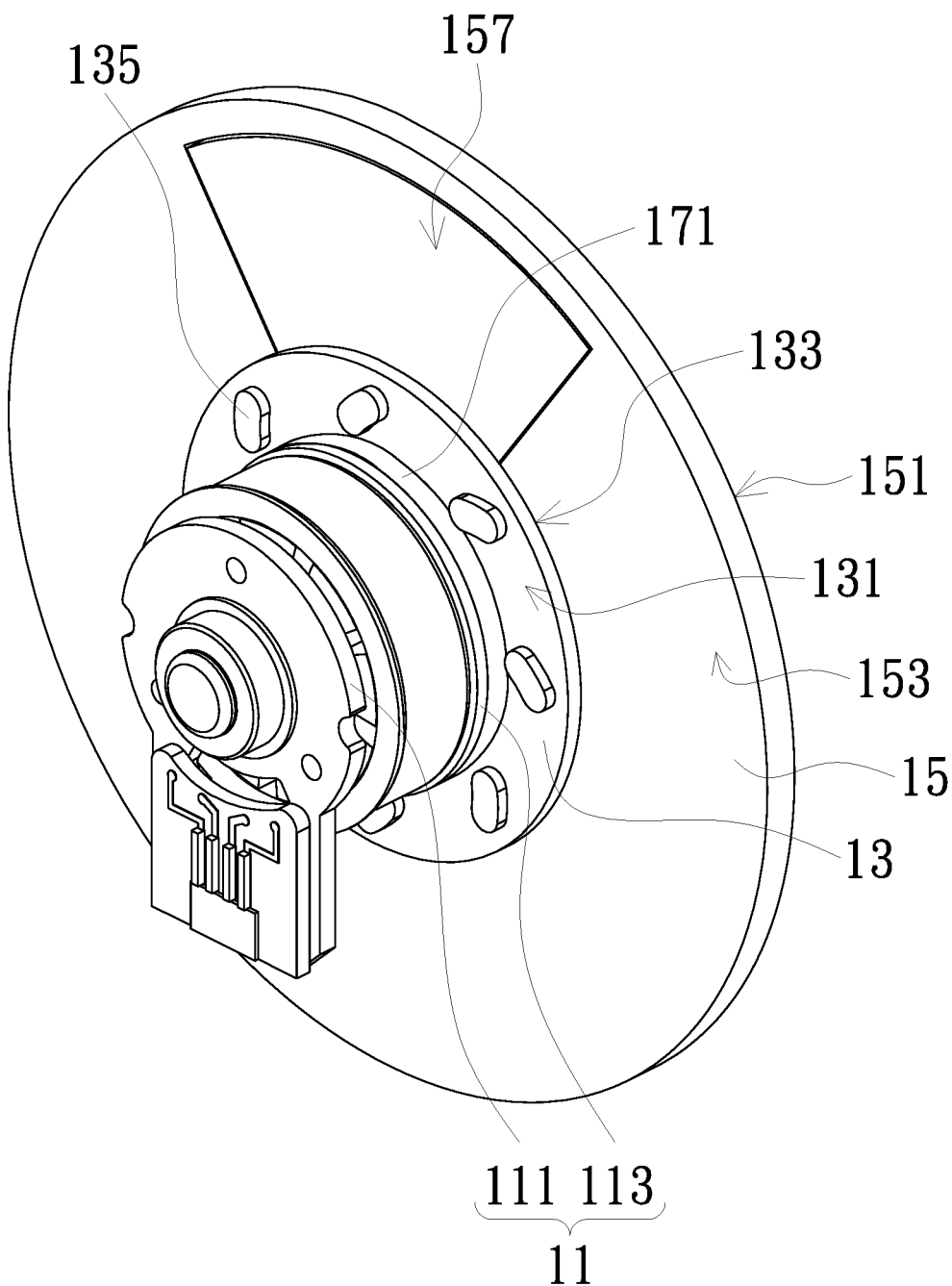
FIGS. 2A-2C are schematic views of the phosphor wheel shown in FIG. 1.
Figure 2B:
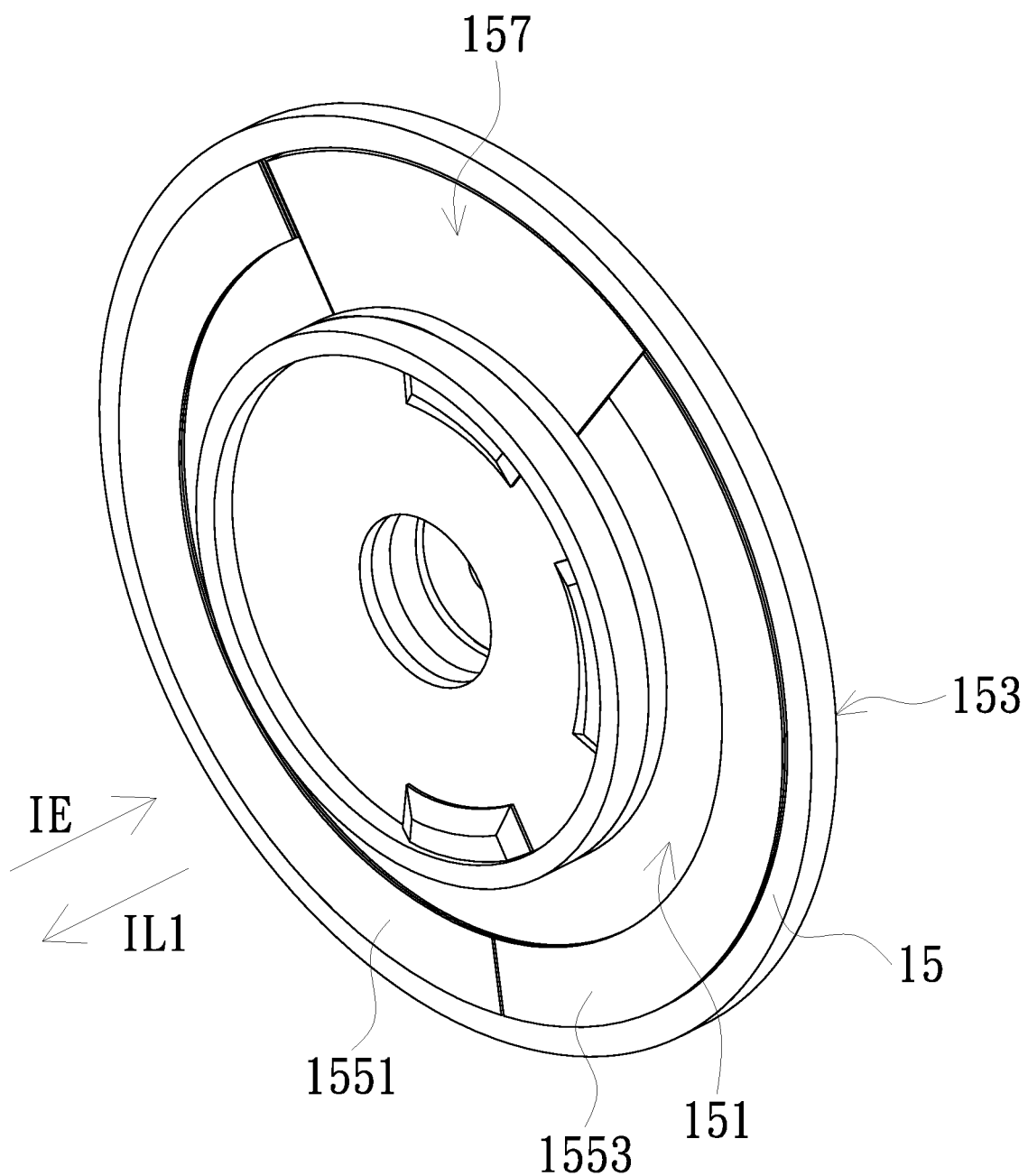
Figure 2C:
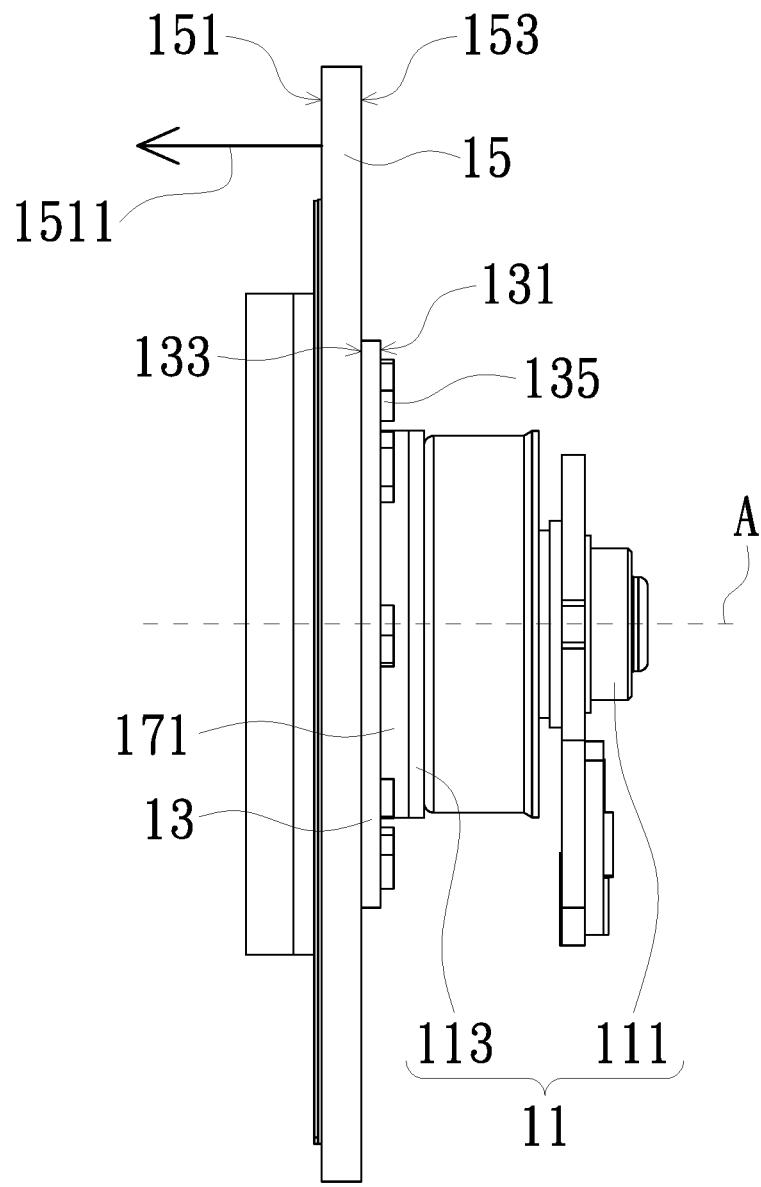

Refer to FIGS. 2A-2C. FIGS. 2A-2C are schematic views of the phosphor wheel 10 shown in FIG. 1. Specifically, FIG. 2A is a perspective view of the phosphor wheel 10 from a viewing angle, FIG. 2B is a perspective view of the phosphor wheel 10 from another viewing angle, and FIG. 2C is a side view of the phosphor wheel 10. As shown in FIG. 2A, the phosphor wheel 10 of the embodiment includes a driving motor 11, a temperature interference element 13 and a substrate 15. As shown in FIG. 2B, the phosphor wheel 10 further includes light wavelength converting layers 1551 and 1553. The driving motor 11 includes a motor body 111 and a rotating member 113. The motor body 111 drives the rotating member 113 to rotate relative to the motor body 111 along a rotation axis A (as shown in FIG. 2C). The temperature interference element 13 is disposed on the rotating member 113. The substrate 15 is disposed on the temperature interference element 13, and the temperature interference element 13 is located between the substrate 15 and the motor body 111 on the rotation axis A. The motor body 111 drives the rotating member 113 along the rotation axis A to drive the temperature interference element 13 and the substrate 15 to rotate relative to the motor body 111. In the embodiment, the area of the third surface 131 of the temperature interference element 13 is larger than 1.5 times the contact area of the rotating member 113 of the driving motor 11 and the third surface 131, so as to effectively block the heat transferred from the substrate 15 to the motor 11, but the invention is not limited thereto.

The substrate 15 includes a first surface 151 and a second surface 153 that are disposed opposite to each other. As shown in FIG. 2C, the normal direction 1511 of the first surface 151 is parallel to the rotation axis A. The second surface 153 is located between the first surface 151 and the rotating member 113. The light wavelength converting layers 1551 and 1553 are disposed on the first surface 151 of the substrate 15. Taking FIG. 2B as an example, the light wavelength converting layers 1551 and 1553 are for converting the incident exciting beam IE into the converted beam IL1. When the motor body 111 drives the rotating member 113 to rotate the substrate 15 relative to the motor body 111, the exciting beam IE incident on the phosphor wheel 10 can be irradiated on the light wavelength converting layers 1551 and 1553 in turn, and the converted beam IL1 can be reflected by the substrate 15. Thus, as shown in FIG. 1, the illumination beam IL may include the converted beam IL1. Heat is generated when the light wavelength converting layer 1551 or 1553 converts the incident exciting beam IE into the converted beam IL1.

In addition, other optical elements such as a lens (not shown) may be disposed on the transmission path of the converted beam IL1 for causing the converted beam IL1 reflected by the phosphor wheel 10 to have a better light collecting effect.

In the embodiment, the temperature interference element 13 of the phosphor wheel 10 is exemplified by a heat insulating element, but the invention is not limited thereto. In other embodiments of the invention, the temperature interference element may be a heat dissipating element. In the embodiment, the temperature interference element 13 may, for example, include a material having a thermal conductivity k of less than 1 W/mK, such as a plastic or non-metal material. By the arrangement of the temperature interference element 13 having the heat insulating effect, the temperature interference element 13 can block the heat conduction between the substrate 15 and the driving motor 11 and reduce the degree of heat generated by the light wavelength converting layers 1551 and 1553 to the driving motor 11, thereby preventing the driving motor 11 from being damaged or having a reduced life by heat.

In addition, the substrate 15 may be, for example, a heat dissipating element. The substrate 15 may, for example, include a material having a thermal conductivity k greater than 10 W/mK. By the arrangement of the substrate 15 having the heat dissipating effect, the heat generated on the light wavelength converting layer 1551 or 1553 can be conducted by the substrate 15 to reduce the amount of heat accumulated on the light wavelength converting layer 1551 or 1553, and thereby reducing the possibility that the light wavelength converting layer 1551 or 1553 is damaged by heat and achieving the effect of heat dissipation.

Specifically, the temperature interference element 13 includes a third surface 131 and a fourth surface 133 that are disposed opposite to each other. The third surface 131 is located between the fourth surface 133 and the rotating member 113, and the fourth surface 133 is located between the third surface 131 and the second surface 153 of the substrate 15. In the embodiment, the area of the fourth surface 133 of the temperature interference element 13 is smaller than the area of the second surface 153 of the substrate 15, but the invention is not limited thereto.

In addition, the temperature interference element 13 may further include, for example, at least one spoiler 135. The spoiler 135 is disposed on the third surface 131 and protrudes from the third surface 131. When the driving motor 11 drives the temperature interference element 13 and the substrate 15 to rotate, the spoiler 135 can move the air to generate an air flow to generate a heat dissipating effect, and thereby greatly reducing the impact of the heat generated by the optical wavelength converting layer 1551 or 1553 to the driving motor 11. The structure and form of the spoiler 135 shown in FIG. 2A are merely illustrative and are not intended to limit the invention. The spoiler 135 is a protruding member, or the spoiler 135 is a recessing portion.

In the embodiment, the phosphor wheel 10 may further include, for example, an adhesive layer 171. The adhesive layer 171 is disposed between the temperature interference element 13 and the rotating member 113 of the driving motor 11, so that the temperature interference element 13 can be bonded to the rotating member 113. The temperature interference element 13 is fixed to the rotating member 113 by the adhesion/gluing force of the adhesive layer 171. The adhesive layer 171 may include, for example, a material having a lower thermal conductivity (k less than 1 W/mK) and a better heat insulating effect, so as to reduce the degree of the heat generated by the light wavelength converting layer 1551 or 1553 to the driving motor 11. The adhesive layer 171 may include, for example, a silicone material, and the thickness of the adhesive layer 171 may be, for example, between 0.05 mm and 0.4 mm.

In addition, the substrate 15 may further include, for example, an optical zone 157. The optical zone 157 is, for example, an aperture or provided with a light transmissive element (glass sheet). Beam can penetrate to the second surface 153 from the first surface 151, that is, the optical zone 157 is for allowing the beam to penetrate the substrate 15. When the substrate 15 is rotated relative to the motor body 111, the exciting beam IE incident on the phosphor wheel 10 can be irradiated on the light wavelength converting layers 1551, 1553 and the optical zone 157 in turns, so that a portion of the exciting beam IE can penetrate the phosphor wheel 10. In other embodiments of the invention, the optical zone 157 may, for example, also be provided with a reflective element or a transflective element (not shown) so that a portion of the exciting beam IE may be reflected by or penetrate the phosphor wheel 10.

The embodiment is exemplified by that the phosphor wheel 10 includes two light wavelength converting layers 1551 and 1553; however, the number of light wavelength converting layers included in the phosphor wheel is not limited in the invention. The shape, size and position of the light wavelength converting layers 1551 and 1553 on the first surface 151 shown in FIG. 2B are only an example, and the structure and form of the motor body 111 and the rotating member 113 shown in FIG. 2A are also only an example, and the invention is not limited thereto.

Figure 3:
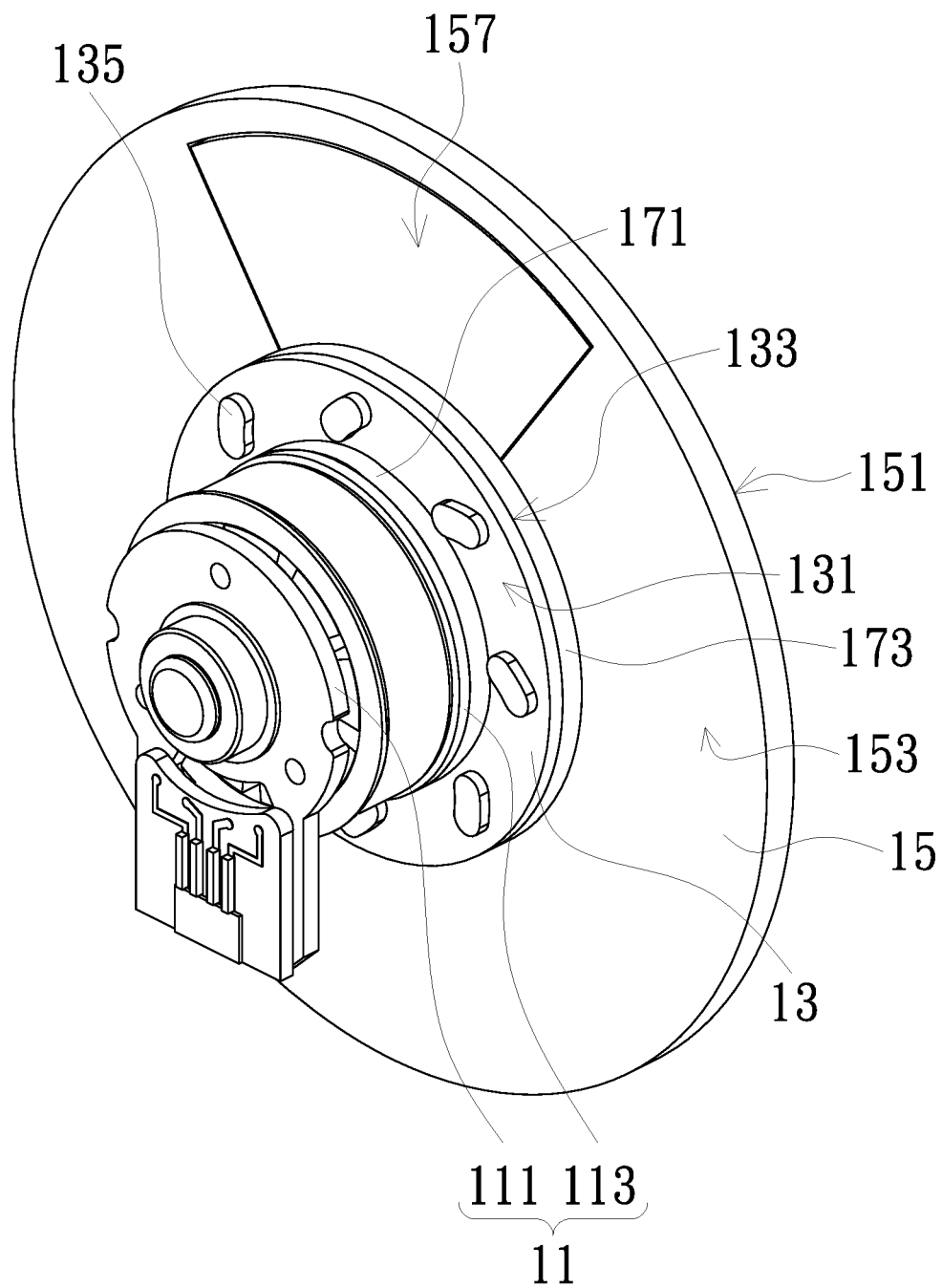
FIG. 3 is a schematic view of a phosphor wheel according to another embodiment of the invention.

FIG. 3 is a schematic view of a phosphor wheel according to another embodiment of the invention. Referring to FIG. 3, in the embodiment, the phosphor wheel 20 includes a driving motor 11, a temperature interference element 13 and a substrate 15. The phosphor wheel 20 of the embodiment has a structure and function similar to the phosphor wheel 10 shown in FIGS. 2A-2C. The main difference between this embodiment and the embodiment shown in FIGS. 2A-2C is: the phosphor wheel 20 further includes an adhesive layer 173. The adhesive layer 173 is disposed between the temperature interference element 13 and the substrate 15, so that the substrate 15 is bonded to the temperature interference element 13. The adhesive layer 173 may include, for example, a material having a lower thermal conductivity (k less than 1 W/mK) and a better heat insulating effect, so as to reduce the degree of the heat generated by the light wavelength converting layer (not shown in FIG. 3) to the driving motor 11. The adhesive layer 173 may include, for example, a silicone material, and the thickness of the adhesive layer 173 may be, for example, between 0.05 mm and 0.4 mm.

Figure 4:
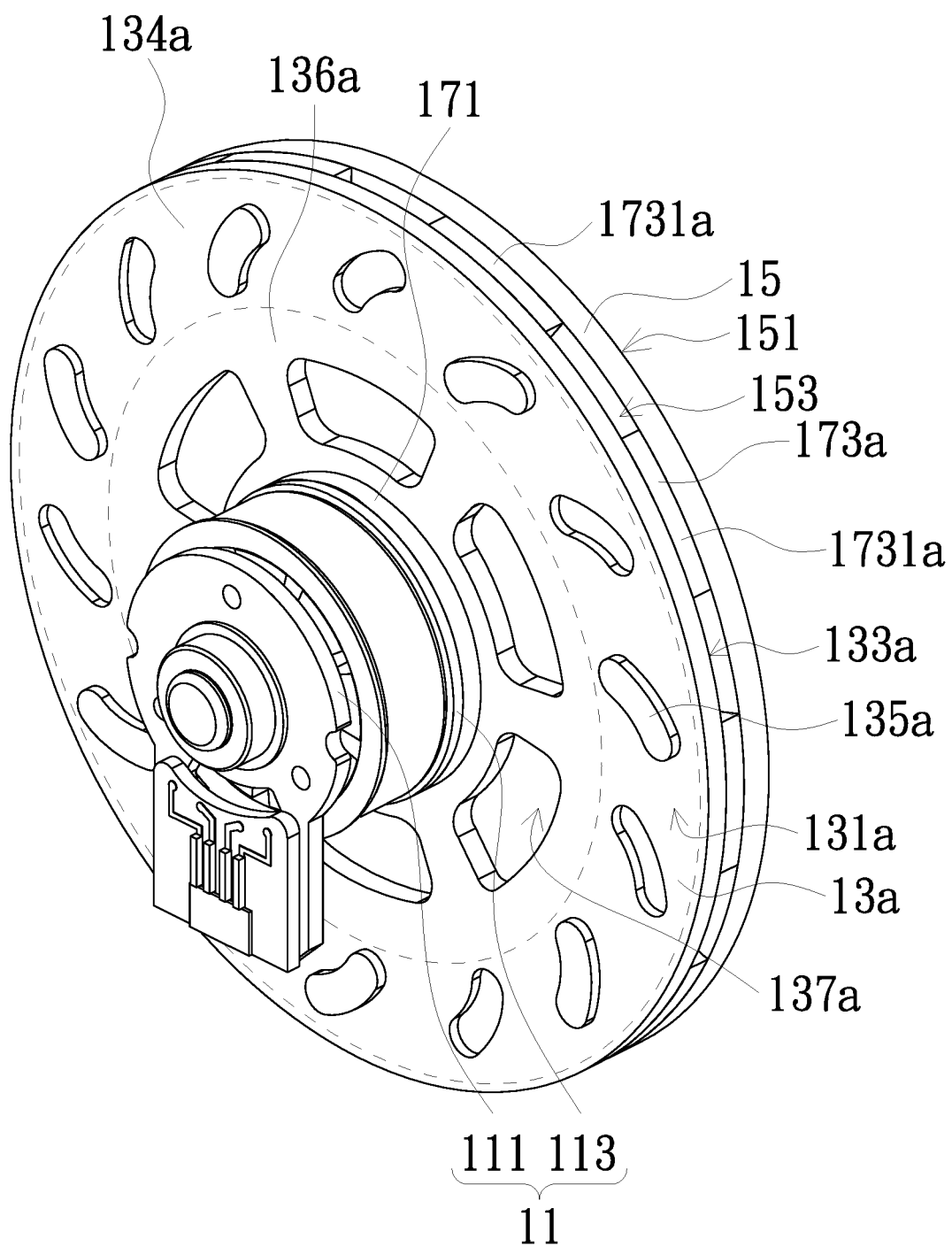
FIG. 4 is a schematic view of a phosphor wheel according to another embodiment of the invention.

FIG. 4 is a schematic view of a phosphor wheel according to another embodiment of the invention. Referring to FIG. 4, in the embodiment, the phosphor wheel 30 includes a driving motor 11, a temperature interference element 13a and a substrate 15. The phosphor wheel 30 of the embodiment has a structure and function similar to the phosphor wheel 10 shown in FIGS. 2A-2C. The main difference between this embodiment and the embodiment shown in FIGS. 2A-2C is: the phosphor wheel 30 further includes an adhesive layer 173a. The adhesive layer 173a is disposed between the temperature interference element 13a and the substrate 15, so that the substrate 15 is bonded to the temperature interference element 13a. The temperature interference element 13a includes a third surface 131a and a fourth surface 133a that are disposed opposite to each other. The third surface 131a is located between the fourth surface 133a and the rotating member 113. The third surface 131a and the fourth surface 133a each include a central region 136a adjacent to the rotating member 113 and a peripheral region 134a away from the rotating member 113, and the peripheral region 134a surrounds the central region 136a. In the embodiment, for example, the fourth surface 133a includes a central region 136a adjacent to the rotating member 113 and a peripheral region 134a away from the rotating member 113, and the peripheral region 134a surrounds the central region 136a. The adhesive layer 173a is disposed between the peripheral region 134a of the temperature interference element 13a and the substrate 15. Since the adhesive layer 173a is disposed in the peripheral region 134a of the temperature interference element 13a, there is an air gap between the temperature interference element 13a and the substrate 15 that does not include the adhesive layer 173a, and air is present in the air gap. Thus, the degree of heat generated by the light wavelength converting layer (not shown in FIG. 4) conducted to the driving motor 11 is further reduced. Therefore, the peripheral region 134a is defined as a region including the adhesive layer 173a, in other words, the central region 136a is not provided with the adhesive layer 173a. Further, the adhesive layer 173a may be disposed in the entire peripheral region 134a to bond the peripheral region 134a of the temperature interference element 13a and the region corresponding to the second surface 153 of the substrate 15.

In addition, in the embodiment, the area and shape of the fourth surface 133a of the temperature interference element 13a are the same as those of the second surface 153 of the substrate 15, but the invention is not limited thereto.

Further, in the embodiment, the adhesive layer 173a may include, for example, a plurality of adhesive blocks 1731a. The adhesive blocks 1731a are disposed to be spaced from each between the peripheral region 134a of the temperature interference element 13a and the substrate 15. The adhesive blocks 1731a may, for example, have a predetermined distance from one another, such that there may be an air gap between the adhesive blocks 1731a, wherein the air gaps allow air to flow. When the driving motor 11 drives the temperature interference element 13a and the substrate 15 to rotate, the air gaps can effectively allow the heat dissipating airflow to flow, so that the heat generated by the substrate 15 can be taken away from the phosphor wheel 30, and thereby achieving the heat dissipating effect and greatly reducing the impact of the heat generated by the light wavelength converting layer to the driving motor 11. In the embodiment, the material included in the adhesive layer 173a may be the same as or similar to the adhesive layer 171 or 173 of the phosphor wheel 20, and no redundant detail is to be given herein.

In addition, the temperature interference element 13a may further include, for example, at least one spoiler 135a. The spoiler 135a is disposed on the third surface 131a and protrudes from the third surface 131a. In other embodiments, the spoiler 135a is disposed on the third surface 131a and recessed on the third surface 131a, or, a spoiler 135a protruding from the third surface 131a and a spoiler 135a recessing on the third surface 131a may be both disposed on the same temperature interference element 13a, but the invention is not limited thereto. In the embodiment, the spoiler 135a is disposed, for example, in the peripheral region 134a of the temperature interference element 13a, but the invention is not limited thereto. The spoiler 135a can generate heat dissipation when the driving motor 11 drives the temperature interference element 13a and the substrate 15 to rotate. In addition, the temperature interference element 13a may further include, for example, at least one heat dissipating hole 137a. The heat dissipating hole 137a is disposed in the central regions 136a of the third surface 131a and the fourth surface 133a. The heat dissipating holes 137a penetrates to the fourth surface 133a from the third surface 131a. The heat dissipating hole 137a is for allowing the airflow to penetrate the temperature interference element 13a. The heat dissipating hole 137a can generate heat dissipation when the driving motor 11 drives the temperature interference element 13a and the substrate 15 to rotate.

In addition, in the embodiment, the temperature interference element 13a of the phosphor wheel 30 is exemplified by a heat insulating member. The temperature interference element 13a may, for example, include a material having a lower thermal conductivity. By the arrangement of the temperature interference element 13a having a heat insulating effect, the temperature interference element 13a can block heat conduction between the substrate 15 and the driving motor 11.

Figure 5:
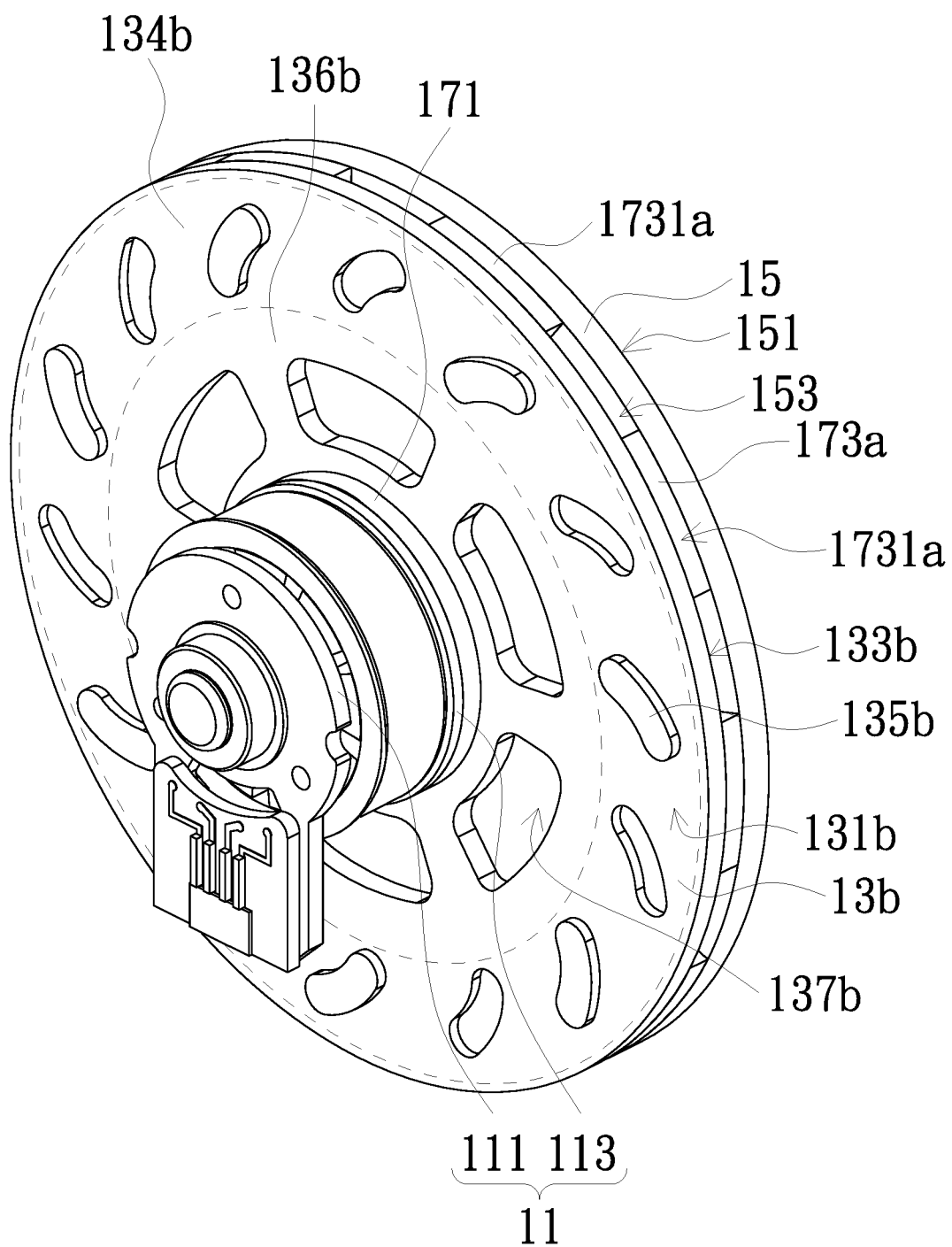
FIG. 5 is a schematic view of a phosphor wheel according to another embodiment of the invention.

FIG. 5 is a schematic view of a phosphor wheel according to another embodiment of the invention. Referring to FIG. 5, in the embodiment, the phosphor wheel 40 includes a driving motor 11, a temperature interference element 13b and a substrate 15. The phosphor wheel 40 of the embodiment has a structure and function similar to the phosphor wheel 30 shown in FIG. 4. The main difference between this embodiment and the embodiment shown in FIG. 4 is: the temperature interference element 13b is exemplified by a heat dissipating element. The temperature interference element 13b may, for example, include a material having a thermal conductivity k greater than 10 W/mK, such as a metal. By the arrangement of the temperature interference element 13b having a heat dissipating effect, the temperature interference element 13b can conduct the heat from the substrate 15. The temperature interference element 13b can generate heat dissipation when the driving motor 11 drives the temperature interference element 13b and the substrate 15 to rotate. Further, by the arrangements of the spoiler 135b in the peripheral region 134b of the temperature interference element 13b and the heat dissipating hole 137b in the central region 136b of the temperature interference element 13a, the heat from the substrate 15 to the temperature interference element 13b is transferred to air by heat convection caused by the rotation of the temperature interference element 13b.

In the embodiment, the structures of the third surface 131b, the fourth surface 133b, the central region 136b, the peripheral region 134b, the spoiler 135b, and the heat dissipating hole 137b of the temperature interference element 13b are similar to those of the third surface 131a, the fourth surface 133a, the central region 136a, the peripheral region 134a, the spoiler 135a, and the heat dissipating holes 137a of the temperature interference element 13a shown in FIG. 4, and no redundant detail is to be given herein.

Figure 6A:
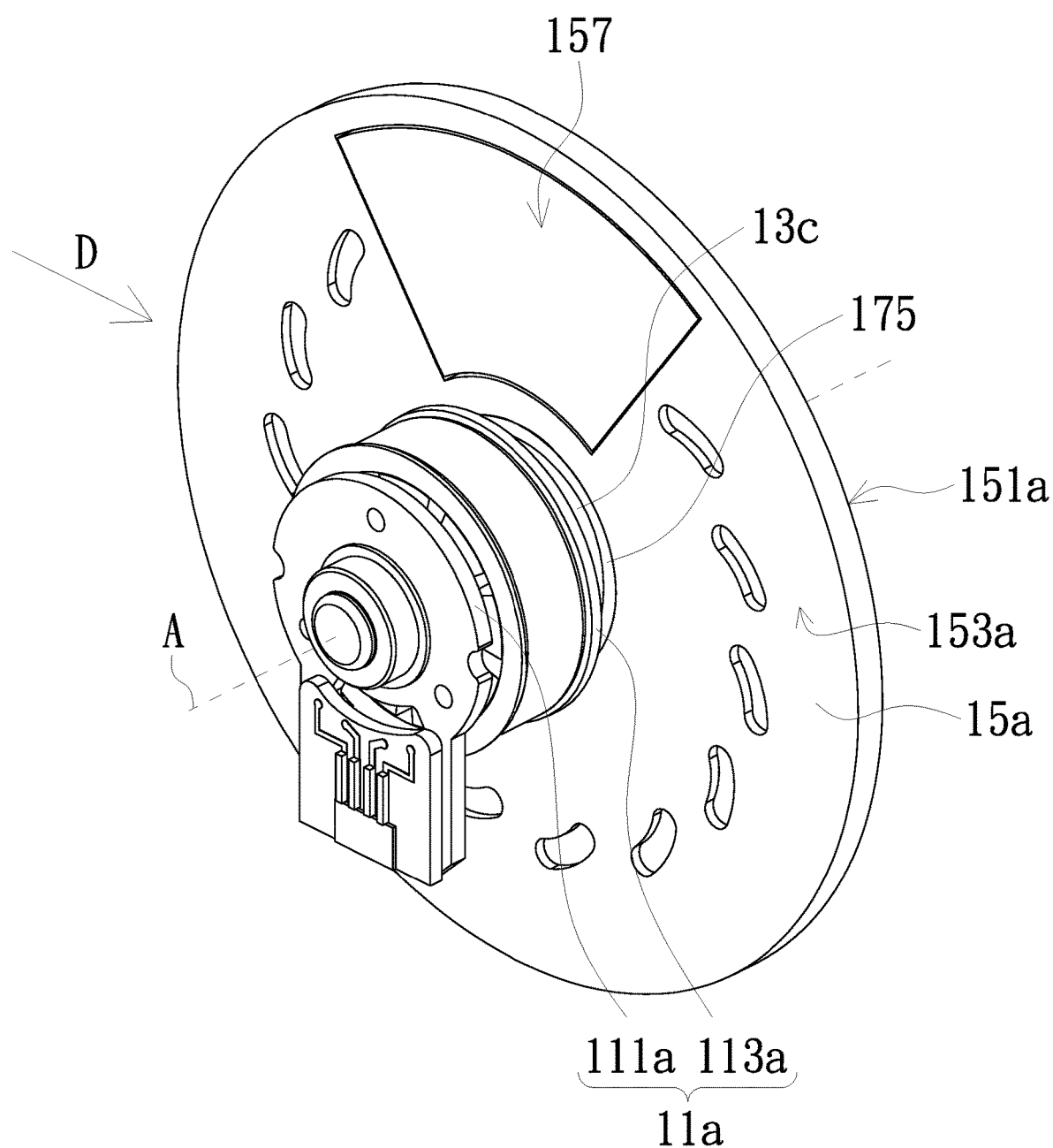
FIGS. 6A-6B are schematic views of a phosphor wheel according to another embodiment of the invention.
Figure 6B:
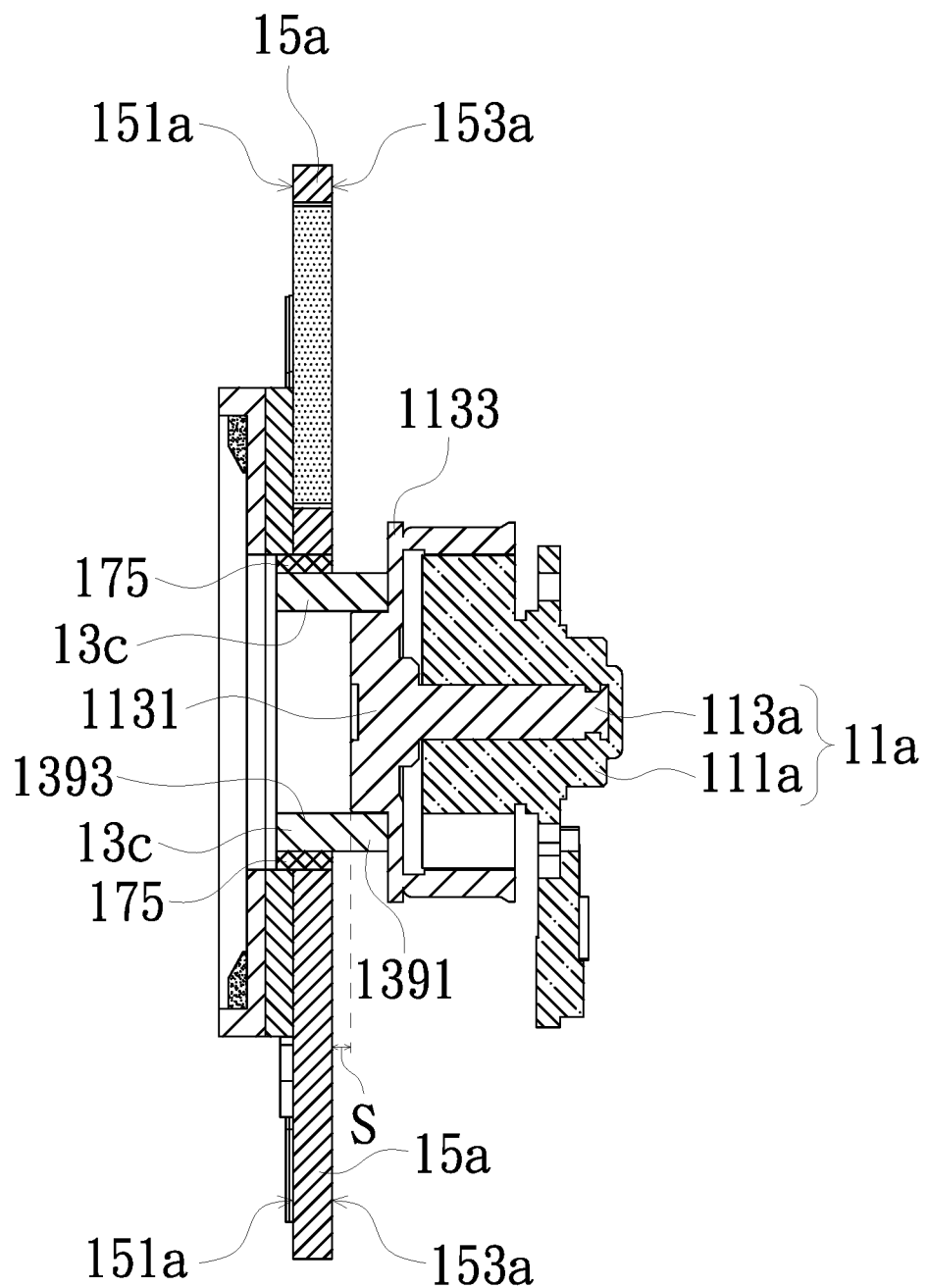

FIGS. 6A-6B are schematic views of a phosphor wheel according to another embodiment of the invention. Specifically, FIG. 6A is a perspective view of the phosphor wheel 50, and FIG. 6B is a schematic cross-sectional view of the phosphor wheel 50 of FIG. 6A at the rotation axis A when viewed in the direction D. Referring to FIGS. 6A-6B, the phosphor wheel 50 includes a driving motor 11a, a temperature interference element 13c and a substrate 15a. The driving motor 11a includes a motor body 111a and a rotating member 113a. The substrate 15a includes a first surface 151a and a second surface 153a. The substrate 15a may, for example, include a structure similar to the aforementioned spoiler and heat dissipating hole, and the embodiment is exemplified by the heat dissipating hole. The temperature interference element 13c includes a first bonding structure 1391 and a second bonding structure 1393. The temperature interference element 13c is bonded to the rotating member 113a by the first bonding structure 1391, and the temperature interference element 13c is bonded to the substrate 15a by the second bonding structure 1393. As such, the temperature interference element 13c is fixed to the rotating member 113a, the substrate 15a is fixed to the temperature interference element 13c, and the temperature interference element 13c is rotated along the rotation axis A.

In the embodiment, the temperature interference element 13c of the phosphor wheel 50 is exemplified by a heat insulating element. The temperature interference element 13c may, for example, include a material having a lower thermal conductivity. By the arrangement of the temperature interference element 13c having the heat insulating effect, the temperature interference element 13c can block the heat conduction between the substrate 15 and the driving motor 11a and reduce the impact of the heat generated by the light wavelength converting layer (not shown in FIGS. 6A and 6B) to the driving motor 11a, thereby preventing the driving motor 11a from being damaged or having a reduced life by heat. The effects and functions of the driving motor 11a and the substrate 15a are similar to those of the driving motor 11 and the substrate 15 described in FIGS. 2A-2C, and no redundant detail is to be given herein.

Specifically, the rotating member 113a includes a convex portion 1131 and a flat portion 1133. The surface of the convex portion 1131 of the rotary member 113a has a predetermined distance S from the second surface 153a of the substrate 15a in the direction of the rotation axis A, and the temperature interference element 13c is a heat insulating member. As such, the impact of the heat generated by the light wavelength converting layer on the driving motor 11a can be effectively reduced.

In addition, the phosphor wheel 50 may further include, for example, an adhesive layer 175. The adhesive layer 175 is disposed between the second bonding structure 1393 and the substrate 15a, so that the substrate 15a can be bonded to the temperature interference element 13c. The adhesive layer 175 may include, for example, a material having a lower thermal conductivity (k less than 1 W/mK) and a better heat insulating effect (e.g., a silica gel material), which can reduce the heat conduction from the light wavelength converting layer to the driving motor 11a.

In the embodiment, the structure of the temperature interference element 13c is exemplified by a hollow cylinder, and the first bonding structure 1391 and the second bonding structure 1393 are disposed at the two ends of the temperature interference element 13c respectively. The substrate 15a is disposed to surround the second bonding structure 1393 of the temperature interference element 13c, and the first bonding structure 1391 is disposed to surround the convex portion 1131 of the rotating member 113a and attach the planar portion 1133 of the rotating member 113a, but the invention is not limited thereto. The structure and form of the first bonding structure 1391 and the second bonding structure 1393 of the temperature interference element 13c shown in FIGS. 6A-6B are merely illustrative and are not intended to limit the invention. The structure and form of the first bonding structure 1391 are not limited as long as that the temperature interference component 13c and the rotating member 113a can be bonded, and the structure and form of the second bonding structure 1393 are not limited as long as that the temperature interference component 13c and the substrate 15a can be bonded. The rotating member 113a may include a structure for bonding with the first bonding structure 1391, and the substrate 15a may include a structure for bonding with the second bonding structure 1393.

Figure 7:
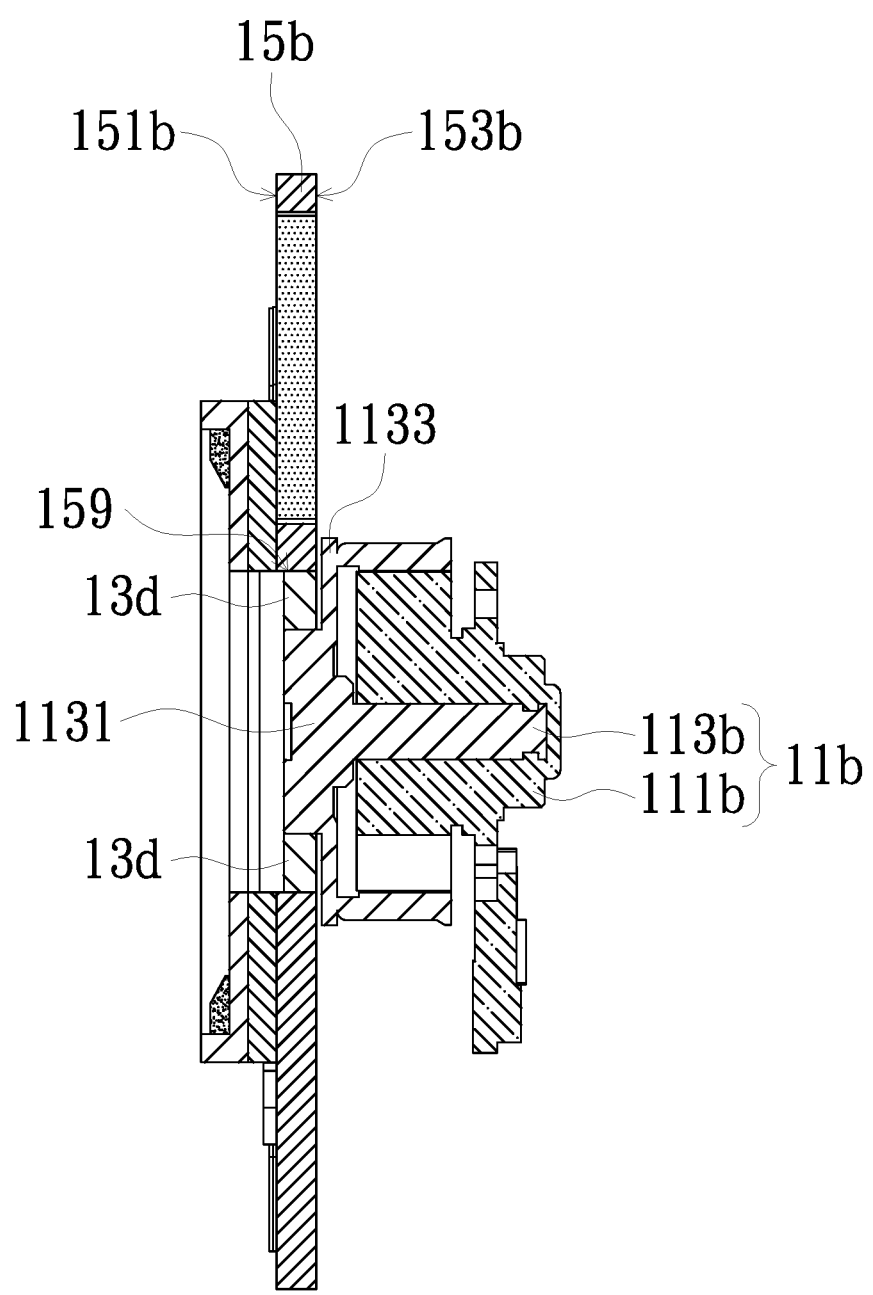
FIG. 7 is a schematic cross-sectional view of a phosphor wheel according to another embodiment of the invention.

FIG. 7 is a schematic cross-sectional view of a phosphor wheel according to another embodiment of the invention. Referring to FIG. 7, in the embodiment, the phosphor wheel 60 includes a driving motor 11b, a temperature interference element 13d and a substrate 15b. The driving motor 11b includes a motor body 111b and a rotating member 113b. The substrate 15b includes a first surface 151b and a second surface 153b. The phosphor wheel 60 of the embodiment has a structure and function similar to the phosphor wheel 50 shown in FIGS. 6A-6B. The main difference between this embodiment and the embodiment shown in FIGS. 6A-6B is: the convex portion 1131 of the rotating member 113b penetrates the central hole 159 of the substrate 15b. The temperature interference element 13d is disposed to surround the convex portion 1131 of the rotating member 113b and is located at the convex portion 1131 and the periphery of the center hole 159. By the arrangement of the convex portion 1131 of the rotating member 113b and the center hole 159 of the substrate 15b, the temperature interference element 13d is fixed to the rotating member 113b and the substrate 15b is fixed to the temperature interference element 13d. Further, the temperature interference element 13d does not contact the flat portion 1133 of the rotating member 113b, thus, the contact area is reduced and the heat conducted from the substrate 15b to the driving motor 11b can be reduced.

In the embodiment, the temperature interference element 13d of the phosphor wheel 50 is exemplified by a heat insulating element. The temperature interference element 13d may, for example, include a material having a lower thermal conductivity. By the arrangement of the temperature interference element 13d having the heat insulating effect, the temperature interference element 13d can block the heat conduction between the substrate 15b and the driving motor 11b and reduce the impact of the heat generated by the light wavelength converting layer (not shown in FIG. 7) to the driving motor 11b, thereby preventing the driving motor 11b from being damaged or having a reduced life by heat. The effects and functions of the driving motor 11*b* and the substrate 15*b* are similar to those of the driving motor 11 and the substrate 15 described in FIGS. 2A-2C, and no redundant detail is to be given herein. The structure and form of the convex portion 1131 of the rotating member 113*b*, the flat portion 1133 of the rotating member 113*b*, the central hole 159 of the substrate 15*b*, and the temperature interference element 13*d* shown in FIG. 7 are merely illustrative and are not intended to limit the invention.

In summary, the temperature interference element in the embodiment of the invention has a thickness range of at least greater than 0.2 mm and less than 10 mm, and the thermal conductivity k of the temperature interference element is less than 1 W/mK or t greater than 10 W/mK. In detail, when the temperature interference element has a thickness rang of at least greater than 0.2 mm and less than 10 mm and the thermal conductivity k of the temperature interference element is less than 1 W/mK, the product of the two ranges, for example, less than 0.01 (W/K). Therefore, the heat transferred from the substrate to the driving motor can be effectively blocked by the combination of the thickness and the thermal conductivity of the temperature interference element. Further, when the temperature interference element has a thickness range of at least greater than 0.2 mm and less than 10 mm and the thermal conductivity k of the temperature interference element is greater than 10 W/mK, the product of the two ranges, for example, at least greater than 0.002. Therefore, the heat transferred from the substrate to the temperature interference element can be effectively blocked by the combination of the thickness and the thermal conductivity of the temperature interference element.

The projection apparatus and the phosphor wheel thereof of the embodiment of the invention can reduce the impact of the heat generated by the light wavelength converting layer on the driving motor by providing a temperature interference element between the driving motor and the substrate, thereby preventing the driving motor from being damaged or having a reduced life by heat.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface, the second surface, the first bonding structure and the second bonding structure are only used for distinguishing various elements and do not limit the number of the elements.

What is claimed is:

1. A phosphor wheel, comprising:
    a driving motor, comprising:
        a motor body; and
        a rotating member, wherein the motor body drives the rotating member to rotate relative to the motor body along a rotation axis;
    a temperature interference element, disposed on the rotating member;
    a substrate, disposed on the temperature interference element, wherein the temperature interference element is connected with the rotating member and the substrate, the motor body drives the rotating member to rotate the temperature interference element and the substrate relative to the motor body, the substrate comprises a first surface and a second surface disposed opposite to each other, and the second surface is located between the first surface and the rotating member; and
    at least one light wavelength converting layer, disposed on the first surface of the substrate, wherein the light wavelength converting layer is for converting an exciting beam incident on the light wavelength converting layer into a converted beam, and the temperature interference element comprises at least one spoiler,
    wherein the temperature interference element further comprises a third surface and a fourth surface disposed opposite to each other, the third surface is located between the fourth surface and the rotating member, the at least one spoiler is disposed on the third surface and protrudes or is recessed on the third surface.

2. The phosphor wheel of claim 1, wherein a thickness of the temperature interference element is greater than 0.2 mm and less than 10 mm.

3. The phosphor wheel of claim 2, wherein the temperature interference element is a heat insulating element, and a thermal conductivity of the temperature interference element is less than 1 W/mK.

4. The phosphor wheel of claim 3, wherein a product of the thermal conductivity of the temperature interference element and the thickness of the temperature interference element is less than 0.01.

5. The phosphor wheel of claim 2, wherein the temperature interference element is a heat dissipating element, and a thermal conductivity of the temperature interference element is greater than 10 W/mK.

6. The phosphor wheel of claim 5, wherein a product of the thermal conductivity of the temperature interference element and the thickness of the temperature interference element is greater than 0.002.

7. The phosphor wheel of claim 1, wherein the substrate is a heat dissipating member, and the substrate comprises a material having a thermal conductivity greater than 10 W/mK.

8. The phosphor wheel of claim 1, further comprising an adhesive layer, wherein the adhesive layer is disposed between the temperature interference element and the rotating member to cause the temperature interference element is bonded to the rotating member.

9. The phosphor wheel of claim 1, further comprising an adhesive layer, wherein the adhesive layer is disposed between the temperature interference element and the substrate to cause the substrate is bonded to the temperature interference element.

10. The phosphor wheel of claim 1, wherein the at least one spoiler of the temperature interference component is a protruding member or a recessing portion.

11. A phosphor wheel, comprising:
   a driving motor, comprising:
      a motor body; and
      a rotating member, wherein the motor body drives the rotating member to rotate relative to the motor body along a rotation axis;
   a temperature interference element, disposed on the rotating member;
   a substrate, disposed on the temperature interference element, wherein the temperature interference element is connected with the rotating member and the substrate, the motor body drives the rotating member to rotate the temperature interference element and the substrate relative to the motor body, the substrate comprises a first surface and a second surface disposed opposite to each other, and the second surface is located between the first surface and the rotating member;
   at least one light wavelength converting layer, disposed on the first surface of the substrate, wherein the light wavelength converting layer is for converting an exciting beam incident on the light wavelength converting layer into a converted beam, and the temperature interference element comprises at least one spoiler; and
   an adhesive layer disposed between the temperature interference element and the substrate to cause the substrate is bonded to the temperature interference element, wherein the temperature interference element further comprises a third surface and a fourth surface disposed opposite to each other, the third surface is located between the fourth surface and the rotating member, the temperature interference element further comprises a central region adjacent to the rotating member and a peripheral region away from the rotating member, the peripheral region surrounds the central region, and the adhesive layer is disposed between the peripheral region of the temperature interference element and the substrate.

12. The phosphor wheel of claim 11, wherein the adhesive layer comprises a plurality of adhesive blocks, and the adhesive blocks are disposed to be spaced from each between the peripheral region of the temperature interference element and the substrate, and the adhesive blocks are spaced from each other by a predetermined distance.

13. A phosphor wheel, comprising:
   a driving motor, comprising:
      a motor body; and
      a rotating member, wherein the motor body drives the rotating member to rotate relative to the motor body along a rotation axis;
   a temperature interference element, disposed on the rotating member;
   a substrate, disposed on the temperature interference element, wherein the temperature interference element is connected with the rotating member and the substrate, the motor body drives the rotating member to rotate the temperature interference element and the substrate relative to the motor body, the substrate comprises a first surface and a second surface disposed opposite to each other, and the second surface is located between the first surface and the rotating member; and
   at least one light wavelength converting layer, disposed on the first surface of the substrate, wherein the light wavelength converting layer is for converting an exciting beam incident on the light wavelength converting layer into a converted beam, and the temperature interference element comprises at least one spoiler,
   wherein the temperature interference element further comprises a third surface and a fourth surface disposed opposite to each other, the third surface is located between the fourth surface and the rotating member, the fourth surface is located between the third surface and the second surface of the substrate, and an area of the fourth surface is smaller than an area of the second surface of the substrate.

14. The phosphor wheel of claim 13, wherein the temperature interference element further comprises a third surface and a fourth surface disposed opposite to each other, the third surface is located between the fourth surface and the rotating member, and an area of the third surface is greater than 1.5 times of a contact area of the rotating member.

15. A phosphor wheel, comprising:
   a driving motor, comprising:
      a motor body; and
      a rotating member, wherein the motor body drives the rotating member to rotate relative to the motor body along a rotation axis;
   a temperature interference element, disposed on the rotating member;
   a substrate, disposed on the temperature interference element, wherein the temperature interference element is connected with the rotating member and the substrate, the motor body drives the rotating member to rotate the temperature interference element and the substrate relative to the motor body, the substrate comprises a first surface and a second surface disposed opposite to each other, and the second surface is located between the first surface and the rotating member; and
   at least one light wavelength converting layer, disposed on the first surface of the substrate, wherein the light wavelength converting layer is for converting an exciting beam incident on the light wavelength converting layer into a converted beam, and the temperature interference element comprises at least one spoiler,
   wherein the temperature interference element further comprises a third surface and a fourth surface disposed opposite to each other, the third surface is located between the fourth surface and the rotating member, the fourth surface is located between the third surface and the second surface of the substrate, and an area and a shape of the fourth surface are the same as an area and a shape of the second surface of the substrate.

16. The phosphor wheel of claim 15, wherein the temperature interference element further comprises at least one heat dissipating hole, the temperature interference element further comprises a third surface and a fourth surface disposed opposite to each other, the third surface is located between the fourth surface and the rotating member, the heat dissipating hole penetrates to the fourth surface from the third surface, and the heat dissipating hole is for allowing an airflow to penetrate the temperature interference element.

17. A projection apparatus, comprising: an illumination system, a light valve and a projection lens, wherein the illumination system is for providing an illumination beam, the light valve is disposed on a transmission path of the illumination beam to convert the illumination beam into an image beam, the projection lens is disposed on a transmission path of the image beam, and the illumination system comprises:
   an exciting light source, for providing an exciting beam; and
   a phosphor wheel, disposed on a transmission path of the exciting beam and comprising:
      a driving motor, comprising a motor body and a rotating member, wherein the motor body drives the rotating member to rotate relative to the motor body along a rotation axis;
      a temperature interference element, disposed on the rotating member;
      a substrate, disposed on the temperature interference element, wherein the temperature interference element is connected with the rotating member and the substrate, the motor body drives the rotating member to rotate the temperature interference element and the substrate relative to the motor body, the substrate comprises a first surface and a second surface disposed opposite to each other, and the second surface is located between the first surface and the rotating member; and
      at least one light wavelength converting layer, disposed on the first surface of the substrate, wherein the light wavelength converting layer is for converting the exciting beam incident on the light wavelength converting layer into a converted beam, and the temperature interference element comprises at least one spoiler,
      wherein the temperature interference element further comprises a third surface and a fourth surface disposed opposite to each other, the third surface is located between the fourth surface and the rotating member, the at least one spoiler is disposed on the third surface and protrudes or is recessed on the third surface.

18. A phosphor wheel, comprising:
   a driving motor, comprising a motor body and a rotating member, wherein the motor body drives the rotating member to rotate relative to the motor body along a rotation axis;
   a temperature interference element, disposed on the rotating member;
   a substrate, disposed on the temperature interference element, wherein the temperature interference element is connected with the rotating member and the substrate, the motor body drives the rotating member to rotate the temperature interference element and the substrate relative to the motor body, the substrate comprises a first surface and a second surface disposed opposite to each other, and the second surface is located between the first surface and the rotating member; and
   at least one light wavelength converting layer, disposed on the first surface of the substrate, wherein the light wavelength converting layer is for converting an exciting beam incident on the light wavelength converting layer into a converted beam, and the substrate is disposed to surround the temperature interference element,
   wherein the temperature interference element is in the shape of a hollow cylinder, and the temperature interference element is located between the substrate and the rotating member in a direction perpendicular to the rotation axis.

19. The phosphor wheel of claim 18, wherein the temperature interference element comprises a first bonding structure and a second bonding structure, the temperature interference element is boned to the rotating member by the first bonding structure, the temperature interference element is bonded to the substrate by the second bonding structure, so that the temperature interference element is fixed to the rotating member and the substrate is fixed to the temperature interference element.

20. The phosphor wheel of claim 19, wherein the rotating member has a predetermined distance from the substrate in the rotation axis.

21. The phosphor wheel of claim 19, further comprising an adhesive layer, wherein the adhesive layer is disposed between the second bonding structure and the substrate to cause the substrate is bonded to the temperature interference element.

22. A phosphor wheel, comprising:
   a driving motor, comprising a motor body and a rotating member, wherein the motor body drives the rotating member to rotate relative to the motor body along a rotation axis;
   a temperature interference element, disposed on the rotating member;
   a substrate, disposed on the temperature interference element, wherein the temperature interference element is connected with the rotating member and the substrate, the motor body drives the rotating member to rotate the temperature interference element and the substrate relative to the motor body, the substrate comprises a first surface and a second surface disposed opposite to each other, and the second surface is located between the first surface and the rotating member; and
   at least one light wavelength converting layer, disposed on the first surface of the substrate, wherein the light wavelength converting layer is for converting an exciting beam incident on the light wavelength converting layer into a converted beam, and the substrate is disposed to surround the temperature interference element,
   wherein the rotating member comprises a convex portion, the convex portion penetrates a central hole of the substrate, the temperature interference element is disposed to surround the convex portion of the rotating member and is located at the convex portion and a periphery of the central hole.

23. A projection apparatus, comprising: an illumination system, a light valve and a projection lens, wherein the illumination system is for providing an illumination beam, the light valve is disposed on a transmission path of the illumination beam to convert the illumination beam into an image beam, the projection lens is disposed on a transmission path of the image beam, and the illumination system comprises:
   an exciting light source, for providing an exciting beam; and a phosphor wheel, disposed on a transmission path of the exciting beam and comprising:
  a driving motor, comprising a motor body and a rotating member, wherein the motor body drives the rotating member to rotate relative to the motor body along a rotation axis;
  a temperature interference element, disposed on the rotating member;
  a substrate, disposed on the temperature interference element, wherein the temperature interference element is connected with the rotating member and the substrate, the motor body drives the rotating member to rotate the temperature interference element and the substrate relative to the motor body, the substrate comprises a first surface and a second surface disposed opposite to each other, and the second surface is located between the first surface and the rotating member; and
  at least one light wavelength converting layer, disposed on the first surface of the substrate, wherein the light wavelength converting layer is for converting the exciting beam incident on the light wavelength converting layer into a converted beam, and the substrate is disposed to surround the temperature interference element,
  wherein the temperature interference element is in the shape of a hollow cylinder, and the temperature interference element is located between the substrate and the rotating member in a direction perpendicular to the rotation axis.

* * * * *